(12) United States Patent
Walker et al.

(10) Patent No.: US 7,984,338 B2
(45) Date of Patent: Jul. 19, 2011

(54) PROGRAM COUNTER (PC) TRACE

(75) Inventors: Kevin R. Walker, Los Gatos, CA (US); John H. Mylius, Framingham, MA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/774,346

(22) Filed: May 5, 2010

(65) Prior Publication Data
US 2010/0218051 A1 Aug. 26, 2010

Related U.S. Application Data

(63) Continuation of application No. 11/697,428, filed on Apr. 6, 2007, now Pat. No. 7,743,279.

(51) Int. Cl.
*G06F 11/00* (2006.01)

(52) U.S. Cl. .......................................................... 714/45

(58) Field of Classification Search ................. 714/38.1, 714/45
See application file for complete search history.

(56) References Cited

U.S. PATENT DOCUMENTS

| | | | |
|---|---|---|---|
| 4,501,003 A | 2/1985 | Miller | |
| 6,948,155 B2 | 9/2005 | Agarwala et al. | |
| 7,043,668 B1 | 5/2006 | Treue et al. | |
| 7,047,178 B2 * | 5/2006 | Agarwala | 703/23 |
| 7,047,451 B2 | 5/2006 | Agarwala et al. | |
| 7,055,070 B1 * | 5/2006 | Uhler et al. | 714/45 |
| 7,069,544 B1 * | 6/2006 | Thekkath | 717/128 |
| 7,080,283 B1 | 7/2006 | Songer et al. | |
| 7,100,151 B2 | 8/2006 | Johnsen et al. | |
| 7,124,072 B1 * | 10/2006 | Thekkath et al. | 703/26 |
| 7,134,116 B1 | 11/2006 | Thekkath et al. | |
| 7,159,101 B1 | 1/2007 | Thekkath et al. | |
| 7,168,066 B1 | 1/2007 | Thekkath et al. | |
| 7,174,543 B2 * | 2/2007 | Schwemmlein et al. | 717/128 |
| 7,178,133 B1 | 2/2007 | Thekkath | |
| 7,181,728 B1 | 2/2007 | Thekkath | |
| 7,315,808 B2 | 1/2008 | Swoboda et al. | |
| 7,318,017 B2 | 1/2008 | Swoboda | |
| 7,318,176 B2 | 1/2008 | Agarwala et al. | |
| 7,783,863 B1 * | 8/2010 | Nelson et al. | 712/220 |
| 2003/0051122 A1 * | 3/2003 | Sato | 712/227 |
| 2004/0030962 A1 * | 2/2004 | Swaine et al. | 714/45 |
| 2004/0102950 A1 * | 5/2004 | Agarwala et al. | 703/23 |

(Continued)

OTHER PUBLICATIONS

Mark Hayter, "Zen and the Art of SOC Design," Microprocessor Summit 2006, Session MPS-960 High End Processors, PA Semi, Apr. 3, 2006, 14 pages.

(Continued)

*Primary Examiner* — Bryce P Bonzo
(74) *Attorney, Agent, or Firm* — Stephen J. Curran; Meyertons, Hood, Kivlin, Kowert & Goetzel, P.C.

(57) ABSTRACT

In one embodiment, an integrated circuit comprises a first processor configured to output program counter (PC) trace records, wherein PC trace records provide data indicating the PCs of instructions retired by the first processor. The integrated circuit further comprises a second source of trace records, and a trace unit coupled to receive the PC trace records from the first processor and the trace records from the second source. The trace unit comprises a trace memory into which the trace unit is configured to store the PC trace records and trace records from the second source. The trace unit is configured to interleave the PC trace records and the trace records from the second source in the trace memory according to the order of receipt of the records.

23 Claims, 9 Drawing Sheets

U.S. PATENT DOCUMENTS

| | | | |
|---|---|---|---|
| 2004/0103397 A1* | 5/2004 | Agarwala et al. | 717/128 |
| 2004/0117700 A1* | 6/2004 | Swoboda et al. | 714/724 |
| 2004/0117701 A1* | 6/2004 | Swoboda et al. | 714/724 |
| 2004/0117717 A1* | 6/2004 | Swoboda | 714/776 |
| 2004/0133388 A1* | 7/2004 | Swoboda | 702/177 |
| 2004/0153808 A1 | 8/2004 | Agarwala et al. | |
| 2004/0250164 A1* | 12/2004 | Ahmad et al. | 714/30 |
| 2006/0271989 A1* | 11/2006 | Glaser et al. | 725/111 |
| 2007/0180333 A1* | 8/2007 | Thekkath et al. | 714/45 |
| 2008/0075015 A1* | 3/2008 | Lindvall et al. | 370/252 |
| 2008/0288741 A1* | 11/2008 | Lee et al. | 711/200 |

OTHER PUBLICATIONS

James B. Keller, "The PWRficient Processor Family," PA Semi, Oct. 2005, 31 pages.

* cited by examiner

Data Packet Format

| 0 | 1:31 | |
|---|---|---|
| 0 | trnc | PC[32:61] |
| 1 | PC[0:30] | |
| 1 | PC[31:61] | |
| 0 | ASID | |

PROGRAM COUNTER (PC) TRACE

This application is a continuation of U.S. application Ser. No. 11/697,428, which was filed on Apr. 6, 2007 now U.S. Pat. No. 7,743,279.

BACKGROUND

1. Field of the Invention

This invention is related to the field of integrated circuits that include processors, and more particularly to generating program counter (PC) traces in such integrated circuits.

2. Description of the Related Art

Electronic systems of various types include processors, also referred to as central processing units (CPUs). A processor can include multiple integrated circuit "chips". The so-called microprocessor is typically a processor on a single chip, with no other "non-processor" functionality. More recently, processors have been integrated with other functionality in devices commonly referred to as integrated processors, embedded processors, and system on a chip (SOC) devices.

The processors execute programs, and can interact with other devices in the system under control of the program being executed. The program comprises one or more instruction sequences, which can include branches within the sequences, branches to other sequences, etc. Each instruction is identified by an address, or PC, which locates the instruction in memory (indirectly, when address translation is enabled).

During development of the system and programs to execute on the system, various debugging aids can be useful. For example, the stream of PCs executed by the processor may be useful to determine the program flow. Both functional problem diagnoses (traditional debugging) and performance problem diagnoses (e.g. determining why performance is lower than desired or expected) can benefit from having the stream of PCs executed by the processor.

As frequency of operation increases, the number of PCs that need to be tracked in a unit of real time (e.g. a second) increases. Additionally, as the complexity of the processor and/or the integrated circuit including the processor increases (superscalar design, multiple cores per chip, etc.), the number of PCs per clock cycle increases. Accordingly, the number of PCs that need to be captured in real time expands dramatically.

SUMMARY

In one embodiment, an integrated circuit comprises a first processor configured to output program counter (PC) trace records, wherein PC trace records provide data indicating the PCs of instructions retired by the first processor. The integrated circuit further comprises a second source of trace records, and a trace unit coupled to receive the PC trace records from the first processor and the trace records from the second source. The trace unit comprises a trace memory into which the trace unit is configured to store the PC trace records and trace records from the second source. The trace unit is configured to interleave the PC trace records and the trace records from the second source in the trace memory according to the order of receipt of the records.

In another embodiment, an integrated circuit comprises a first processor configured to output PC trace records, wherein the PC trace records provide data indicating the PCs of instructions retired by the first processor. Additionally, the PC trace records comprise control records and data records, and a given data record is associated with a given control record. An order of the given data record and the given control record in the PC trace records is arbitrary for at least some control records and corresponding data records. That is, either the given control record or its given data record may appear first in the trace. A trace unit is coupled to receive the plurality of PC trace records, wherein the trace unit comprises a trace memory into which the trace unit is configured to store the plurality of PC trace records.

In an embodiment, a method comprises: outputting a plurality of program counter (PC) trace records from a first processor on an integrated circuit to a trace unit on the integrated circuit, wherein the plurality of PC trace records provide data indicating the PCs of instructions retired by the first processor; outputting a plurality of trace records from a second source of trace records on the integrated circuit to the trace unit; and receiving the plurality of PC trace records and the plurality of trace records in the trace unit; and storing the plurality of PC trace records and the plurality of trace records in a trace memory in the trace unit, the storing comprising interleaving the plurality of PC trace records and the trace records from the second source in the trace memory according to the order of receipt of the records.

BRIEF DESCRIPTION OF THE DRAWINGS

The following detailed description makes reference to the accompanying drawings, which are now briefly described.

Figure 1:
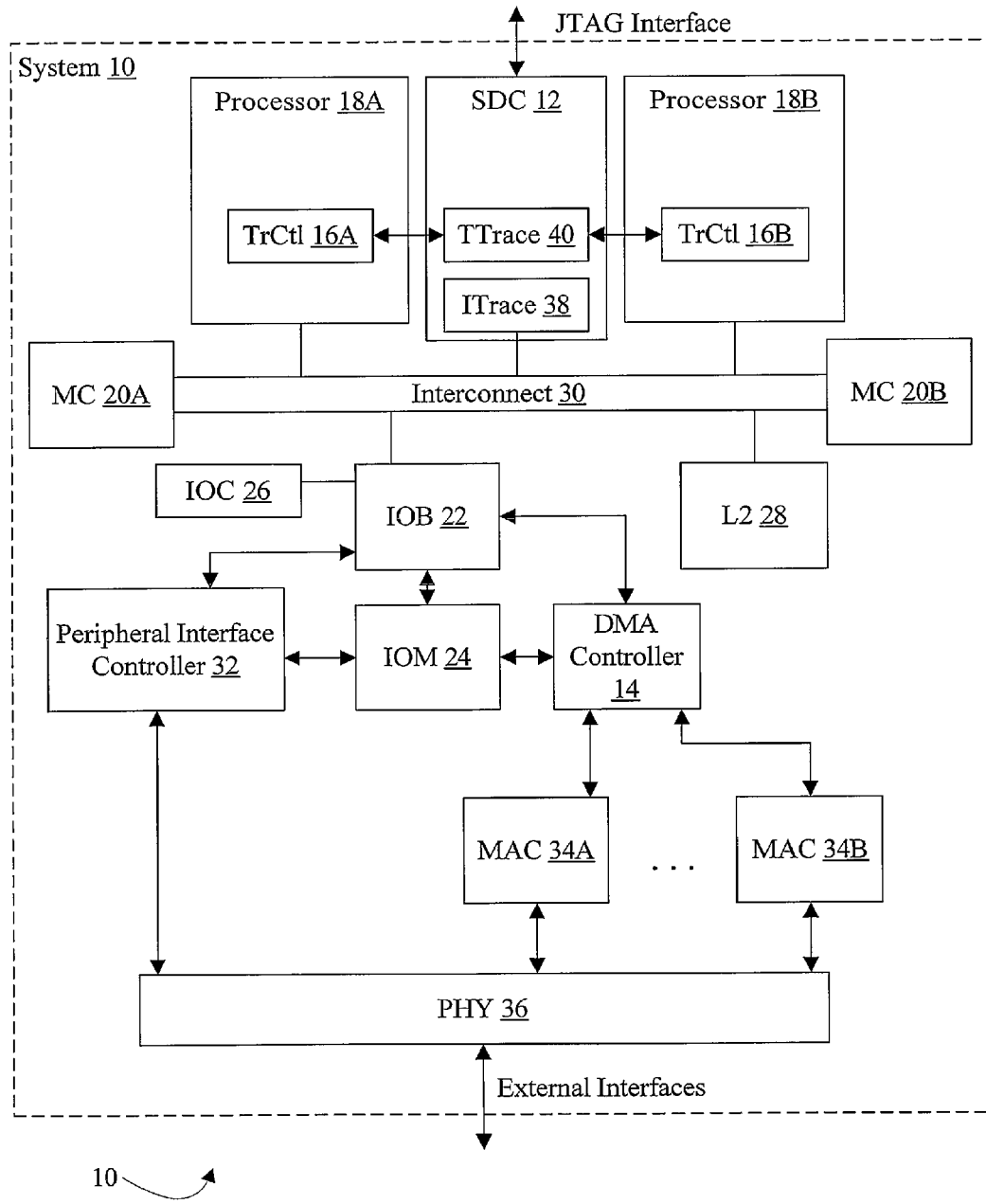
FIG. 1 is a block diagram of one embodiment of a system on a chip.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the illustrated embodiment, the system 10 includes a system debug controller (SDC) 12, a DMA controller 14, one or more processors such as processors 18A-18B, one or more memory controllers such as memory controllers 20A-20B, an I/O bridge (IOB) 22, an I/O memory (IOM) 24, an I/O cache (IOC) 26, a level 2 (L2) cache 28, an interconnect 30, a peripheral interface controller 32 and one or more media access control circuits (MACs) such as MACs 34A-34B, and a physical interface layer (PHY) 36.

The SDC 12, the processors 18A-18B, memory controllers 20A-20B, IOB 22, and L2 cache 28 are coupled to the interconnect 30. The IOB 22 is further coupled to the IOC 26 and the IOM 24. The DMA controller 14 is also coupled to the IOB 22 and the IOM 24. The MACs 34A-34B are coupled to the DMA controller 14 and to the physical interface layer 36. The peripheral interface controller 32 is also coupled to the I/O bridge 22 and the I/O memory 34 (and thus indirectly coupled to the DMA controller 14) and to the physical interface layer 36. The SDC 12 is coupled to a Joint Test Access Group (JTAG) interface. In some embodiments, the components of the system 10 may be integrated onto a single integrated circuit as a system on a chip. In other embodiments, the system 10 may be implemented as two or more integrated circuits.

In the illustrated embodiment, the processors 18A-18B include respective trace controllers (TrCtls) 16A-16B and the SDC 12 includes an interface trace unit (ITrace) 38 and a transaction trace unit (TTrace) 40. The trace controllers 16A-16B are coupled to the transaction trace unit 40. As will be seen in FIG. 2, the interface trace unit 38 is also coupled to the transaction trace unit 40.

In one embodiment, the processors 18A-18B (and more particularly the trace controllers 16A-16B, in the illustrated embodiment) are configured to generate PC trace records. The PC trace records include data that indicates that PCs of instructions that are executed by the processors 18A-18B. More particularly, the PC trace records may indicate the PCs of the instructions retired by the processors 18A-18B. In the illustrated embodiment, each processor 18A-18B provides PC trace records to the transaction trace unit 40. The transaction trace unit 40 includes a trace memory into which trace records, including PC trace records, are stored. In the illustrated embodiment, the PC trace records from the processor 18A and the PC trace records from the processor 18B may be interleaved in the trace memory, according to the temporal order in which the records are received. That is, consecutive entries in the trace memory may store trace records from different sources.

While the PC trace records of the two processors may be interleaved in the present embodiment, in general a processor 18A-18B and any other source of trace records may be interleaved. For example, the interface trace unit 38 may generate interface trace records capturing activity on the interface 30 (e.g. transactions, packets, etc., depending on the definition of the interface 30). The trace records from the interface trace unit 38 may be interleaved with the PC trace records from one or more processors 18A-18B.

Permitting the interleave of trace records from more than one source may, in some embodiments, increase the efficiency of use of the trace memory. If a given source is generating more trace records than another source, the given source may consume more of the trace memory and thus may have effectively more trace memory available than if a static division of the trace memory is provided (or if separate trace memories are provided for each source). Additionally, the interleave of records may provide information about the relative timing of events traced from different sources (e.g. relative timing of instruction execution and a corresponding transaction on the interface 30).

As used herein, a trace record may comprise data that is captured with regard to an underlying activity or value, that indicates the underlying activity/value. The trace record may be a direct copy of the underlying activity/value, or may indirectly specify the activity/value in cooperation with other trace records. Interface trace records may trace activity on the interface, for example. PC trace records may trace the PCs of instructions executed by the processor. An initial PC record (referred to as a start PC record herein) may indicate that a trace is being started and may include one or more corresponding data records the capture the start PC. Subsequent records (retire records) may indicate the number of instructions retired in a given clock cycle, and may identify taken branches. If instructions are being successfully retired without taken branches, the count of retired instructions may be used with the start PC to generate additional PCs. If a taken branch is identified, the program code can be searched to identify the target PC (e.g. for relative branches) or the retire record may include one or more corresponding data records that capture the target PC (e.g. for indirect branches).

The sets of trace records may, at least in some cases, reduce the amount of storage in the trace memory that is consumed to capture a PC trace (e.g. as compared to capturing each PC individually), but may still provide a wealth of information about the program flow of the program being executed.

In one embodiment, the PC trace records include control records and data records. The control records provide data indicating the PCs and certain other events that cause abrupt changes to the PCs in a trace. The data records are associated with certain control records, and supply a PC that corresponds to the control record. For example, the start PC record and the retire record described above may be control records. Other control records may include an exception record or records that record exception events (causing a change to a PC at which the exception handler is stored), loss recovery PCs that are written when one or more control records have been dropped (not recorded in the trace memory) due to conflicts in transmitting the records for storage, synchronization records, to provide checkpoints in the PC trace record stream, etc. An exemplary embodiment will be described in more detail below.

If a given control record has a corresponding data record, the order of the control record and its corresponding data record is arbitrary, for at least some control records. That is, either the control record or the data record may be transmitted first by the processor. If there is more than one data record for the control record (or if the data record comprises more than one data packet, as in one embodiment described in more detail below), the control record can appear within the set of data records, before the data records, or after the data records. The stream of PC trace records may be separated into control and data records, and the data can be matched with the corresponding control records. Removing ordering constraints may simplify PC trace record collection, which may permit efficiency in collection and may, in some cases, avoid the dropping of a record. For example, removing ordering constraints may prevent dropping a record that would have been held for ordering purposes but that would be overwritten before it can be transmitted. In one embodiment, there may be some ordering constraints with respect to certain records. For example, records used to synchronize (or resynchronize) a trace may impose an ordering requirement. Corresponding data records, if any, for a synchronizing control record may be required to appear after the synchronizing control record. Additionally, data corresponding to control records that were prior to the synchronizing control record may be required to appear before the synchronizing control records and data corresponding to control records that are subsequent to the synchronizing control record may be required to appear after the synchronizing control record. In one implementation described in more detail below, the synchronizing control records may include the Start PC record, the Loss Recovery PC record, and the Synchronization record.

In addition to the tracing functionality mentioned above, the SDC 12 may support other debug functions in the system 10. For example, the SDC 12 may providing debug clocking controls, support scan functionality, support JTAG functionality, support trapping interface communications, software-driven data logging, and/or any other features. Any combination of debug features may be provided in various embodiments.

The system 10 may comprise one or more address spaces. At least a portion of an address space in the system 10 may be mapped to memory locations in the memory to which the memory controllers 20A-20B may each be coupled. The memory is not shown in FIG. 1. In some cases, the entirety of the address space may be mapped to the memory locations. In other cases, some of the address space may be memory-mapped I/O (e.g. the peripheral interface controlled by the peripheral interface controller 32 may include some memory-mapped I/O). Furthermore, in one embodiment, the trace memory in the transaction trace unit 40 may be mapped into the memory space for read/write access by the processors 18A-18B and/or the DMA controller 14.

The DMA controller 14 is configured to perform DMA transfers between the interface circuits 16 and the host address space. Additionally, the DMA controller 14 may, in some embodiments, be configured to perform DMA transfers between sets of memory locations within the address space (referred to as a "copy DMA transfer"). The copy DMA may be used to move data from the trace memory in the transaction trace unit 40 to the memory system, for example.

The DMA controller 14 may also be configured to perform one or more operations (or "functions") on the DMA data as the DMA data is being transferred, in some embodiments. In one embodiment, some of the operations that the DMA controller 14 performs are operations on packet data (e.g. encryption/decryption, cyclical redundancy check (CRC) generation or checking, checksum generation or checking, etc.). The operations may also include an exclusive OR (XOR) operation, which may be used for redundant array of inexpensive disks (RAID) processing, for example.

In general, DMA transfers may be transfers of data from a source to a destination, where at least one of the destinations is a memory location or other address(es) in the host address space. The DMA transfers are accomplished without the transferred data passing through the processor(s) in the system (e.g. the processors 18A-18B). The DMA controller 14 may accomplish DMA transfers by reading the source and writing the destination.

The processors 18A-18B comprise circuitry to execute instructions defined in an instruction set architecture implemented by the processors 18A-18B. Specifically, one or more programs comprising the instructions may be executed by the processors 18A-18B. Any instruction set architecture may be implemented in various embodiments. For example, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

The memory controllers 20A-20B comprise circuitry configured to interface to memory. For example, the memory controllers 20A-20B may be configured to interface to dynamic random access memory (DRAM) such as synchronous DRAM (SDRAM), double data rate (DDR) SDRAM, DDR2 SDRAM, Rambus DRAM (RDRAM), etc. The memory controllers 20A-20B may receive read and write transactions for the memory to which they are coupled from the interconnect 30, and may perform the read/write operations to the memory.

The L2 cache 28 may comprise a cache memory configured to cache copies of data corresponding to various memory locations in the memories to which the memory controllers 20A-20B are coupled, for low latency access by the processors 18A-18B and/or other agents on the interconnect 30. The L2 cache 28 may comprise any capacity and configuration (e.g. direct mapped, set associative, etc.).

The IOB 22 comprises circuitry configured to communicate transactions on the interconnect 30 on behalf of the DMA controller 14 and the peripheral interface controller 32. The interconnect 30 may support cache coherency, and the IOB 22 may participate in the coherency and ensure coherency of transactions initiated by the IOB 22. In the illustrated embodiment, the IOB 22 employs the IOC 26 to cache recent transactions initiated by the IOB 22. The IOC 26 may have any capacity and configuration, in various embodiments, and may be coherent. The IOC 26 may be used, e.g., to cache blocks of data which are only partially updated due to reads/writes generated by the DMA controller 14 and the peripheral interface controller 32. Using the IOC 26, read-modify-write sequences may be avoided on the interconnect 30, in some cases. Additionally, transactions on the interconnect 30 may be avoided for a cache hit in the IOC 26 for a read/write generated by the DMA controller 14 or the peripheral interface controller 32 if the IOC 26 has sufficient ownership of the cache block to complete the read/write. Other embodiments may not include the IOC 26.

The IOM 24 may be used as a staging buffer for data being transferred between the IOB 22 and the peripheral interface controller 32 or the DMA controller 14. Thus, the data path between the IOB 22 and the DMA controller 14/peripheral interface controller 32 may be through the IOM 24. The control path (including read/write requests, addresses in the host address space associated with the requests, etc.) may be between the IOB 22 and the DMA controller 14/peripheral interface controller 32 directly. The IOM 24 may not be included in other embodiments.

The interconnect 30 may comprise any communication medium for communicating among the processors 18A-18B, the memory controllers 20A-20B, the L2 cache 28, and the IOB 22. For example, the interconnect 30 may be a bus with coherency support. The interconnect 30 may alternatively be a point-to-point interconnect between the above agents, a packet-based interconnect, or any other interconnect. The interconnect may be coherent, and the protocol for supporting coherency may vary depending on the interconnect type.

The MACs 34A-34B may comprise circuitry implementing the media access controller functionality defined for network interfaces. For example, one or more of the MACs 34A-34B may implement the Gigabit Ethernet standard. One or more of the MACs 34A-34B may implement the 10 Gigabit Ethernet Attachment Unit Interface (XAUI) standard. Other embodiments may implement other Ethernet standards, such as the 10 Megabit or 100 Megabit standards, or any other network standard. In one implementation, there are 6 MACs, 4 of which are Gigabit Ethernet MACs and 2 of which are XAUI MACs. Other embodiments may have more or fewer MACs, and any mix of MAC types.

Among other things, the MACs 34A-34B that implement Ethernet standards may strip off the inter-frame gap (IFG), the preamble, and the start of frame delimiter (SFD) from received packets and may provide the remaining packet data to the DMA controller 14 for DMA to memory. The MACs 34A-34D may be configured to insert the IFG, preamble, and SFD for packets received from the DMA controller 14 as a transmit DMA transfer, and may transmit the packets to the PHY 36 for transmission.

The peripheral interface controller 32 comprises circuitry configured to control a peripheral interface. In one embodiment, the peripheral interface controller 32 may control a peripheral component interconnect (PCI) Express interface. Other embodiments may implement other peripheral interfaces (e.g. PCI, PCI-X, universal serial bus (USB), etc.) in addition to or instead of the PCI Express interface.

The PHY 36 may generally comprise the circuitry configured to physically communicate on the external interfaces to the system 10 under the control of the interface circuits 16. In one particular embodiment, the PHY 36 may comprise a set of serializer/deserializer (SERDES) circuits that may be configured for use as PCI Express lanes or as Ethernet connections. The PHY 36 may include the circuitry that performs 8b/10b encoding/decoding for transmission through the SERDES and synchronization first-in, first-out (FIFO) buffers, and also the circuitry that logically configures the SERDES links for use as PCI Express or Ethernet communication links. In one implementation, the PHY may comprise 24 SERDES that can be configured as PCI Express lanes or Ethernet connections. Any desired number of SERDES may be configured as PCI Express and any desired number may be configured as Ethernet connections.

It is noted that, in various embodiments, the system 10 may include one or any number of any of the elements shown in FIG. 1 (e.g. processors, memory controllers, caches, I/O bridges, DMA controllers, and/or interface circuits, etc.).

Figure 2:
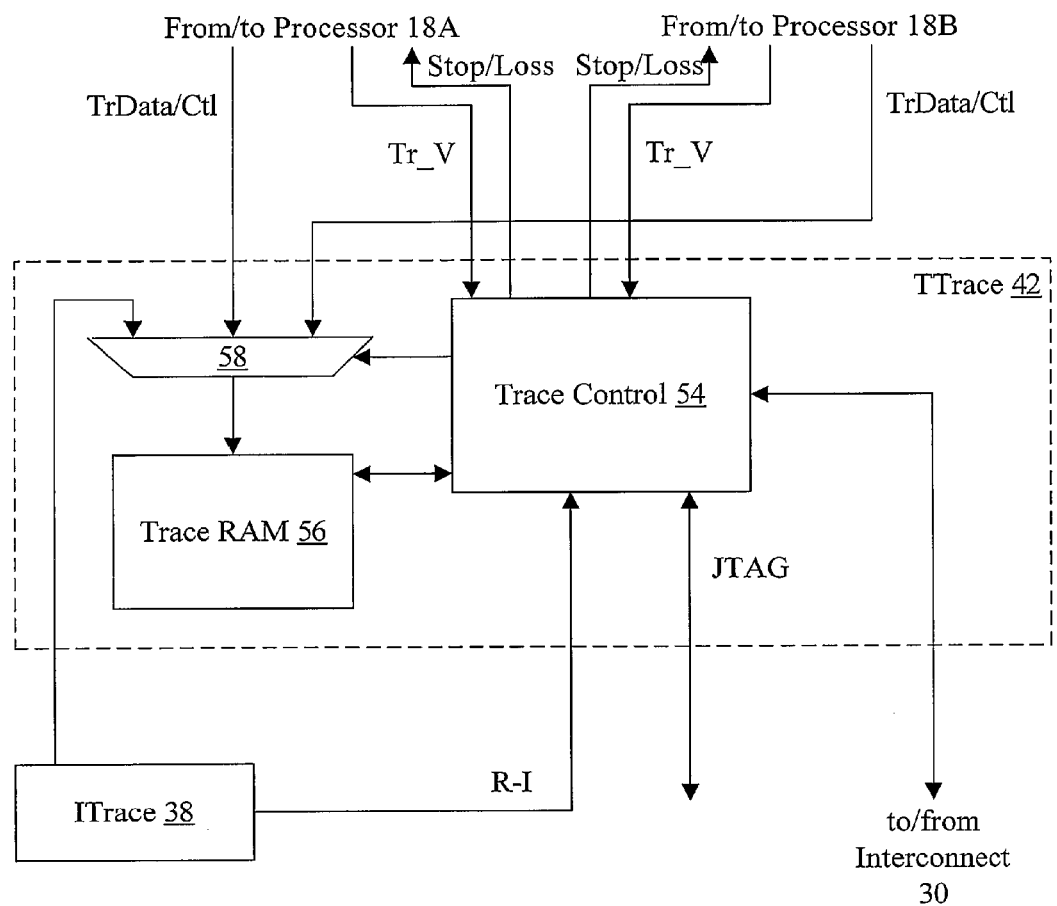
FIG. 2 is a block diagram of a portion of one embodiment of system debug controller shown in FIG. 1.

Turning now to FIG. 2, a block diagram of one embodiment of a portion of the SDC 12 is shown. In the illustrated embodiment, the SDC 12 includes the transaction trace unit 40 and the interface trace unit 38. Other embodiments may include subsets of the units shown, supersets including the units, or sets including subsets of the units shown and other units, as desired.

In the illustrated embodiment, the transaction trace unit 40 comprises a trace control unit 54, a trace memory 56 (a random access memory, or RAM, in this embodiment, although any memory type may be used), and an input mux 58. The input mux 58 is coupled to receive inputs from the processors 18A-18B (and more particularly the trace controllers 16A-16B in FIG. 1), the control unit 54, and the interface trace unit 38. The trace control unit 54 is coupled to provide a selection control to the input mux 58 and is coupled to the trace memory 56. The trace control unit 54 is further coupled to the interface trace unit 38 and the JTAG interface. Additionally, the trace control unit 54 may be coupled to receive transactions from the interconnect 30 and send transaction to the interconnect 30 (e.g. read requests received that mapped to the trace memory 56, requests to communicate with the DMA controller 14, etc.). The trace control unit is still further coupled to the processors 18A-18B (and more particularly the trace controllers 16A-16B).

The input mux 58 is coupled to receive packets of PC trace records from the corresponding processor 18A-18B (TrData/Ctl in FIG. 2). In one embodiment, zero or one packet may be transmitted per clock cycle from each processor 18A-18B, and thus the channel for transmitting the packets may be the same width as a packet. In one implementation, a packet is 32 bits wide and thus the channel is 32 bits wide. Other implementations may implement wider or narrower packets, and the channel width may or may not match the width of a PC trace record (or a multiple thereof, permitting more than one packet to be transferred per clock cycle). In addition to the packet, there may be one or more control signals that indicate the type of packet (e.g. control records or data records). The processors 18A-18B may also provide a control signal (Tr_V) to the trace control unit 54. The processors 18A-18B may assert the Tr_V signal to indicate that a valid packet is being transmitted. Alternatively, the trace control unit 54 may receive the control signals and may determine a valid packet is being transferred from the control signals.

A packet may comprise any number of PC trace records. For example, in one embodiment, a control record may comprise 8 bits and a data record may comprise 32 bits or 64 bits, depending on the PC size. A 32 bit packet may be defined, that comprises either 4 control records or one-half to one data record. In an embodiment in which the order of a control packet and its corresponding data packet is arbitrary, the transfer of packets may be simplified. Control trace records may be accumulated to form a packet, while the corresponding data records are transferred prior to their corresponding control records, for example.

When a processor 18A-18B has a packet to transfer, that processor 18A-18B may assert the Tr_V signals to the trace control unit 54. The interface trace unit 38 may also request to write trace records into the trace memory 56 using the R-I signal in FIG. 2. Thus, in the illustrated embodiment, trace records from up to 3 sources are supported (processor 18A, processor 18B, and the interface trace unit 38). If only one source requests a transfer, there is no conflict and the trace control unit 54 may select the requesting source through the input mux 58. If there is more than one requesting source, the trace control unit 54 may arbitrate among the requestors using any arbitration scheme. In one embodiment, a static priority scheme is used in which the interface trace unit 38 is the highest priority, followed by processor 18A and then processor 18B. Other priority schemes may be used in other embodiments. In another embodiment, a round-robin scheme may be used, or a least-recently-granted scheme may be used.

The trace control unit 54 may also provide read and write addresses to the trace memory 56, and may monitor the fullness of the trace memory 56. In one embodiment, the trace memory 56 may be mapped into an address range in the memory address space, and the trace control unit 54 may receive read requests in the space (from the interconnect 30) and may provide data in response. The read requests may be sourced by the DMA controller 14, if DMA is used to transfer the contents of the trace memory to the memory system, or may be sourced by a processor 18A-18B. Additionally, read requests may be sourced from the JTAG interface. The write addresses may be generated by the trace control unit 54 as packets are written. Accordingly, in this embodiment, trace records may be interleaved on a packet boundary. In other embodiments, the trace memory 56 may store multiple packets per entry and interleave may be performed on a per entry basis.

The trace control unit 54 may also determine that the trace memory 56 is nearly full, or "almost full". The measurement of "almost full" may vary in various embodiments. In one embodiment, a high watermark may be used to determine if the trace memory is almost full. The high watermark may be programmable among a range of entries, for example.

The response of the trace control unit 54 to detecting the almost full condition may vary in various embodiments. The trace control unit 54 may, for example, assert a stop signal to one or both processors 18A-18B, causing them to stall instruction retirement while the trace memory is emptied through JTAG or through DMA. Alternatively, the control unit 54 may not assert the stop signal and may permit loss of PC trace data. If PC trace data is lost, the trace control unit 54 may note the loss in the additional information written to the trace memory 56 and may signal the processor 18A-18B that the loss has occurred. The processor 18A-18B may generate a loss recovery record if loss has occurred, for example.

In one embodiment, there may be three modes for PC tracing. In a lossy mode, no attempt to prevent PC trace record loss is made. If a PC trace record is transmitted and conflicts with another record write, then the record is lost if the other record wins the arbitration. If PC trace records are lost, the trace control unit 54 may indicate the loss to cause a loss recovery record generation from the corresponding processor 18A-18B. In other embodiments, a request/grant interface between the processors 18A-18B and the transaction trace unit 40 may be supported to provide more control over loss. Additionally, loss may occur in a processor 18A-18B itself. For example, if too many data records are generated at the same time, data records may be lost. In this case, the trace controllers 16A-16B may generate a loss recovery record locally and send the loss recovery record for storage.

In a lossless mode, the trace controllers 16A-16B may back pressure the pipeline if PC trace records are ready to be transferred, but have not been transferred. The back pressure may prevent the processor 18A-18B from retiring additional instructions, preventing the loss of data. The trace controllers 16A-16B may also backpressure the pipelines to prevent retire if the trace control unit 54 asserts the stop signal.

A third mode, continuous tracing mode, may use the DMA controller 14 to transfer trace data from the trace memory 56 to the memory system. The trace control unit 54 may assert the stop signal to prevent additional retirement of instructions during the DMA, and may cause the DMA controller 14 to begin the DMA. In one embodiment, the DMA controller 14 may be descriptor-driven. The trace control unit 54 may write a DMA descriptor describing the transfer, and may cause the DMA controller 14 to read the descriptor to perform the DMA. Alternatively, the DMA controller may implement a synchronization control (flag) that can be written by the trace control unit 54 to cause the DMA controller to read the next descriptor, and the DMA descriptors may be created by software. That is, the DMA descriptors may occur in pairs of event descriptor (waiting on the flag) and copy descriptor (performed after the flag is written). In one embodiment of continuous tracing, the processors 18A-18B may stall retirement of instructions in response to the assertion of the stop signal but may still write trace records that are buffered in the processors 18A-18B to the trace memory 56. Once the buffered records are drained, the trace controllers 16A-16B may each signal the trace control unit 54 that there are no more records to be written. The trace control unit 54 may assert an event signal to the DMA controller 14 once each trace controller 16A-16B has signalled that there are no more records to write (e.g. the event signal may write the flag mentioned above). The event signal may cause the DMA controller 14 to copy the data from the trace memory 56 to the memory system. The DMA controller 14 may signal the end of the transfer, and may indicate whether or not there are still descriptors available in the channel used to perform the DMA copies. If there are additional descriptors, tracing may continue. If not, the tracing is stopped and the processors are permitted to continue execution without tracing.

It is noted that, while three sources of trace memory writes are shown in FIG. 2, other embodiments may include additional sources. For example, a software logging mechanism may be supported in which software executing on the processors 18A-18B may write data to the trace memory 56 to log various events detected by software.

Figures 3, 4:
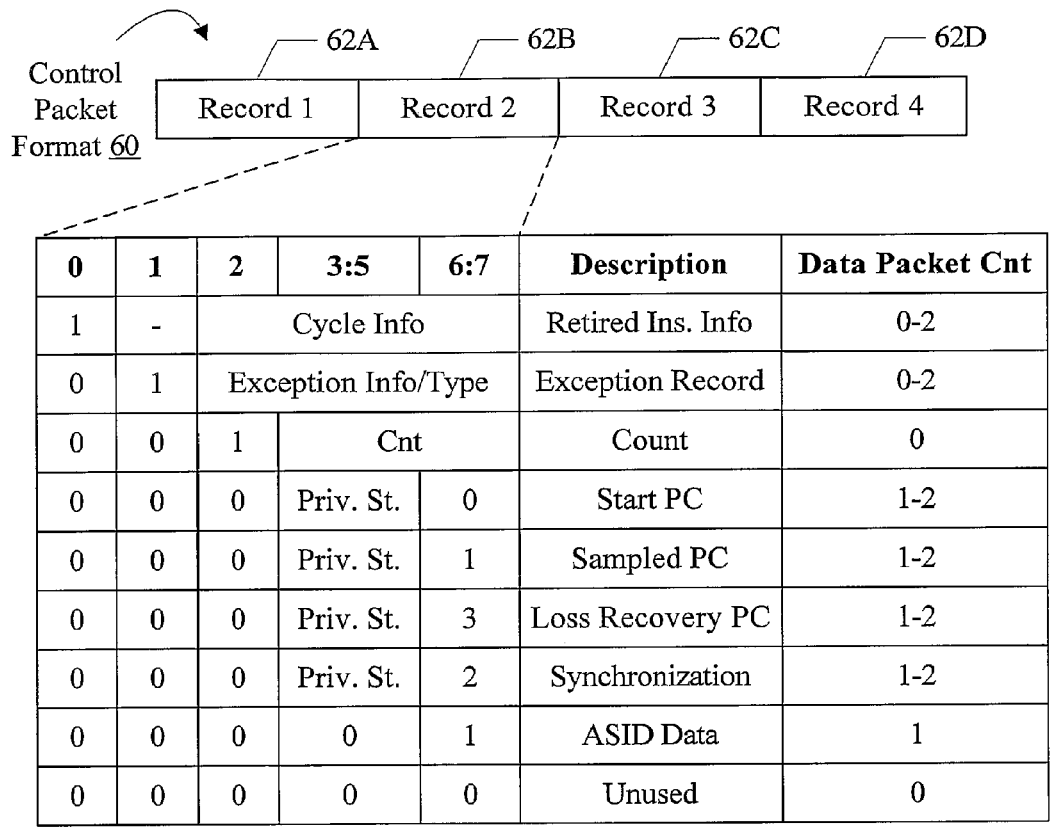
FIG. 3 is a block diagram of one embodiment of a control packet format from a processor.
FIG. 4 is a block diagram of one embodiment of a data packet format from a processor.

Turning next to FIG. 3, a block diagram of one embodiment of a control packet format 60 that may be generated by the processors 18A-18B (and more particularly, the trace controllers 16A-16B) is shown. In the illustrated embodiment, a control packet includes multiple control records 62A-62D. Specifically, each control record 62A-62D may comprise one byte (8 bits) and thus the control packet may be 4 bytes (32 bits). Other sizes of control records and/or packets may be used in other embodiments.

The control record 62B is shown in exploded form in FIG. 3, with a table of the supported records for one embodiment. The table includes the bits of the control record, along with a description of the record and a count of data packets that may be associated with that control packet.

As illustrated, if bit zero of the control record is set, the record is a retired instruction information record (or, more briefly, a retire record). The retire record is generated during tracing, and indicates that one or more instructions were retired in a clock cycle. The cycle info field provides information about the instructions. In one embodiment, the cycle info field may include two bits encoding the number of instructions that were retired. The instruction count may indicate one to four instructions, with the value of zero in the count indicating four. The cycle info field may further include a bit field indicating which instructions, in program order, were taken branch instructions and which were other instructions. For example, a set bit in the bit field may indicate taken branch and a clear bit may indicate other instructions. The retire record may have zero to two associated data packets. If the retired instruction information record indicates no taken branches, or if the taken branches are direct branches (that is, not indirect branches), then there is zero associated data packets. A PC is not needed for non-taken branch instructions, since the PC can be generated from the PC of the preceding instruction. If the instruction is a direct taken branch (e.g. relative branches, or absolute branches), the PC can be derived from the offset in the branch instruction itself, and can be obtained by a post processor reading the program file. If a taken branch is indirect, one to two data packets may be used to provide the target PC. In one embodiment, no more than one indirect branch may be retired per clock cycle so that only one target PC need be captured. Other embodiments may capture multiple target PCs and thus may associate additional data records with the retire record to capture the additional target PCs.

If bit zero of the control record is clear and bit one is set, the record is an exception record that indicates an exception has occurred. The exception info/type field may provide information about the exception. In one embodiment, two exception records may be generated for an exception, and the exception info/type field may be interpreted differently for the two records, giving 12 bits of exception info/type. The type may identify the specific exception, and the info may provide information related to the type of instruction on which the exception was detected, the value of certain machine state register bits, etc. The exception record may include zero to two data packets to capture the PC of the instruction for which the exception was detected and/or the PC to which the exception vectors.

If bits zero and one of the control record are clear and bit two is set, the record is a count record. The count record may comprise a number of consecutive clock cycles (in the Cnt field) for which no control records are generated. The count record has no associated data packets.

The remaining records are identified with bits zero to two of the control record clear. The remaining five bits are coded as shown in FIG. 3. Except for the ASID data record (and the unused record), the remaining records each have one to two associated data packets that comprise the PC. Additionally, for each of the PC records (the remaining records except for the ASID data record), the privilege state of the processor may be recorded (Priv. St. in FIG. 3). The privilege state may be encoded as various non-zero values of the Priv. St. field, so the ASID data record may be identified via a zero value in bits 3:5. Other non-PC records may also be defined using zero in bits 3:5 and other values of bits 6:7. The number of privilege states and their encodings may vary from embodiment to embodiment, dependent at least in part on the instruction set architecture implemented by the processors 18A-18B. The encoding of all zeros is reserved as unused in this embodiment. The unused encoding may be written, e.g., when flushing a partial control packet to the trace memory 56.

The start PC record records the initial PC of the trace. Tracing may be started according to a trigger event, and the start PC may be the PC of the instruction for which the trigger is detected. The sampled PC record may be used to indicate a PC that is near a given instruction, if the PC trace is being filtered for certain instructions. The loss recovery PC record is used to provide a PC when one or more control records are lost, for lossy tracing modes. The synchronization record provides a periodic PC if synchronization is enabled for the trace. That is, every N cycles or instructions (or some other periodic measure), a synchronization PC is recorded to provide points of reference for the post processor software in cases in which loss occurs.

The ASID data record may be generated by a processor if software writes a specified ASID data register, defined to cause ASID data to be written to the trace. The ASID (address space identifier) may serve as a sort of process identifier, and may be used by software to indicate context switches and/or privilege level changes in the trace.

FIG. 4 is a block diagram of one embodiment of the data packet format. In one embodiment, PCs may be either 32 bits or 64 bits, depending on the operating mode of the processor. For one embodiment implementing the PowerPC instruction set architecture, instructions are 4 bytes long and thus the least significant two bits are zero and need not be recorded. Bit zero of the data packet may be clear to indicate a 32 bit PC and set to indicate each packet of a 64 bit PC. For the 32 bit PC, a truncation indication (trnc) indicates whether or not the 32 bit PC is truncated. The 32 bit PC is truncated if at least one non-recorded bit (bits 0:31 of the PC) is non-zero. The ASID may also be included in a data packet, with bit zero of the data packet clear, for the ASID data record shown in FIG. 3. Accordingly, for the embodiment of FIG. 4, a data record may comprise one or two data packets.

Figures 5, 6:
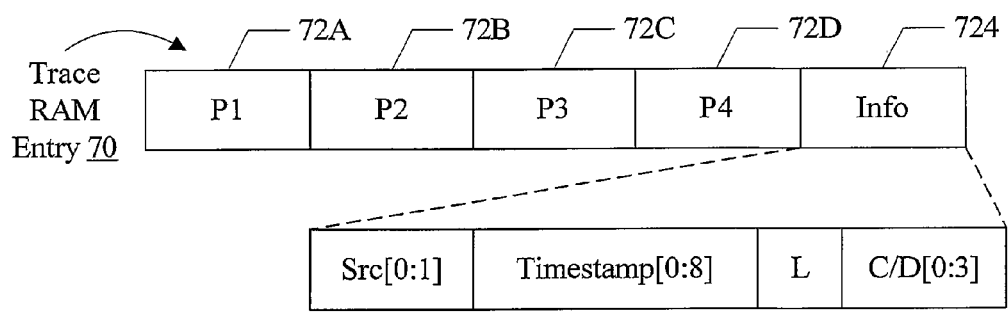
FIG. 5 is a block diagram of one embodiment of a trace memory entry.
FIG. 6 is a block diagram of one embodiment of fields in a configuration register for tracing.

FIG. 5 is a block diagram of one embodiment of an entry 70 in the trace memory 56. In the illustrated embodiment, up to four packets 72A-72D may be stored in an entry. In other embodiments, more or fewer packets may be stored in an entry, including one packet per entry.

In addition to the packets, an information field 74 is stored in the entry. The information field includes a source indication (e.g. Src[0:1], in one embodiment), a timestamp field (Timestamp[0:8], in one embodiment), a loss indicator (L) and a control/data field (C/D[0:3]). The source indication may identify the source of the packets in the entry. Thus, packets from different sources (which may be interleaved in the trace memory 56) can be identified. Specifically, different encodings of the source indication may be assigned to each processor 18A-18B and to the interface trace unit 38. The timestamp field may provide an indication of time, so that the time at which different entries were written can be discerned. The timestamp may be relative to the start of tracing, for example, or relative to the last record written in the trace. The remaining fields of the information field 74 are specific to PC tracing. Other definitions of the remaining fields may be used for other trace records. For example, an entry from the interface trace unit 38 may store the address command in the remaining field. The loss indication (L) may indication whether or not a loss of PC trace records has been detected. Specifically, the loss indication may indicate that one or more records were transmitted to the transaction trace unit 40, but were not written to the trace memory 56 due to contention with other records. The processor 18A-18B for which the record was dropped may be informed, and may generate a loss recovery PC record. However, one or more previous records may still be buffered in the processor 18A-18B, and may be written to the trace memory 56 before the loss recovery PC record. Thus, the loss indication may be used to identify the point in the trace data at which records were lost, and may be used to drop ensuing records from that same processor 18A-18B until a loss recovery PC record is detected. The control/data field (C/D[0:3]) may comprise a bit for each packet indicating whether the packet is a control packet (bit set) or data packet (bit clear).

The embodiment of FIG. 5 illustrates four packets per trace memory entry 70. The four packets may be accumulated in various fashions. For example, storage may be provided before the input mux 58 to accumulate up to four packets before writing the trace memory 56. Alternatively, an entry may be allocated when the first packet is written, and the trace control unit 54 may track the allocated entry to write up to three more packets from the same source to the entry. In other embodiments, the trace control unit 54 may write packets from different sources to the same entry.

FIG. 6 is a block diagram of various programmable features 76 of one embodiment of PC tracing. The features may be logically contained within a register addressable by the processors 18A-18B (one per processor). The physical implementation may include one or more copies of the registers or various fields of the registers, located in various locations within the processors 18A-18B and/or the SDC 12, in some embodiments.

In the illustrated embodiment, tracing may be selectively enabled based on the current privilege state using the T-Hyp, T-Pnh, and T-Pro bits. If tracing is enabled, tracing may be performed at user privilege level (or user state). If the T-Hyp bit is set, tracing is enabled for the Hypervisor state. Hypervisor state may be used for the Hypervisor in a virtualized system, or for the operating system in a non-virtualized system. If the T-Pnh bit is set, tracing is enabled for privileged state that is not the Hypervisor. The privileged-not Hypervisor state may be used for the operating system if there is a Hypervisor for virtualization. If the T-Pro bit is set, tracing is enabled in the problem state. The problem state may be the user/application privilege level. If any privilege levels are not being traced, in one embodiment, a transition from the non-traced privilege level to a traced privilege level may result in the generation of a Start PC record.

The Autosync (AS) bit may be used to enable or disable the automatic insertion of synchronization records, as shown in FIG. 3. The synchronization threshold (ST) field may define the threshold at which synchronization records are stored in the trace. The threshold may be measured in time (cycles elapsed, or real time elapsed), control records written, instructions retired, etc. In one embodiment, the ST field may comprise a bit specifying a 32 control record threshold if clear, or a 64 control record threshold if set. Other embodiments may implement a multi-bit field to specify more thresholds. In one embodiment the autosync functionality may be provided for cases in which the trace memory 56 is configured as a circular buffer, and thus records may be overwritten. The autosync may provide additional synchronization points in the trace data.

The PC size bit (PC Size) may indicate whether 32 bit PCs are being traced or 64 bit PCs. By separating the PC size for tracing from the actual PC size in use, a smaller PC may be traced if desired. For example, for a relatively small program that may be located anywhere in the effective address space but only uses the least significant 32 bits of PC, tracing 32 PCs may be sufficient even if 64 bit PCs are in use. Additionally, if 32 bit PC mode is in use, tracing only 32 bit PCs may reduce the volume of data and thus permit a larger trace to fit in the trace memory 56. The PC Size bit may indicate whether one or two data packets form a data record (e.g. to be associated with a PC trace record shown in FIG. 3).

The Full Cnt field may specify the high watermark for processor buffers, to help ensure loss free operation in lossless tracing modes. If the buffers in the processor fill to the high watermark, retire may be stalled in the processor to prevent loss of data due to buffer fullness.

The LL field may indicate whether or not lossless tracing is desired. For example, if the LL bit is set, then lossless tracing is enabled and if the LL bit is clear, lossy tracing is enabled. The log level field may encode the amount of logging (PC tracing) that is desired. In one embodiment, the log levels may include logging all PCs, logging only the PCs used to reconstruct control flow (branching), or logging only certain tagged instructions (e.g. tagged using breakpoint registers). Logging all PCs may provide data related to retire timing in the processor. To reconstruct the PCs of the program, logging the branch PCs may be sufficient. Additionally, each of the log levels may also include a more verbose option in which the count records are also generated, to permit cycle-accurate tracing. In one embodiment, additional microarchitectural-level tracing may be permitted via other encodings of the log levels. The start mode (SM) field defines how tracing is to be started (e.g. based on breakpoint register matches, performance monitor tags, etc.). In one embodiment, logging may be based on opcode matching so that certain instructions may be traced. The enable (E) enables PC trace mode.

Figure 7:
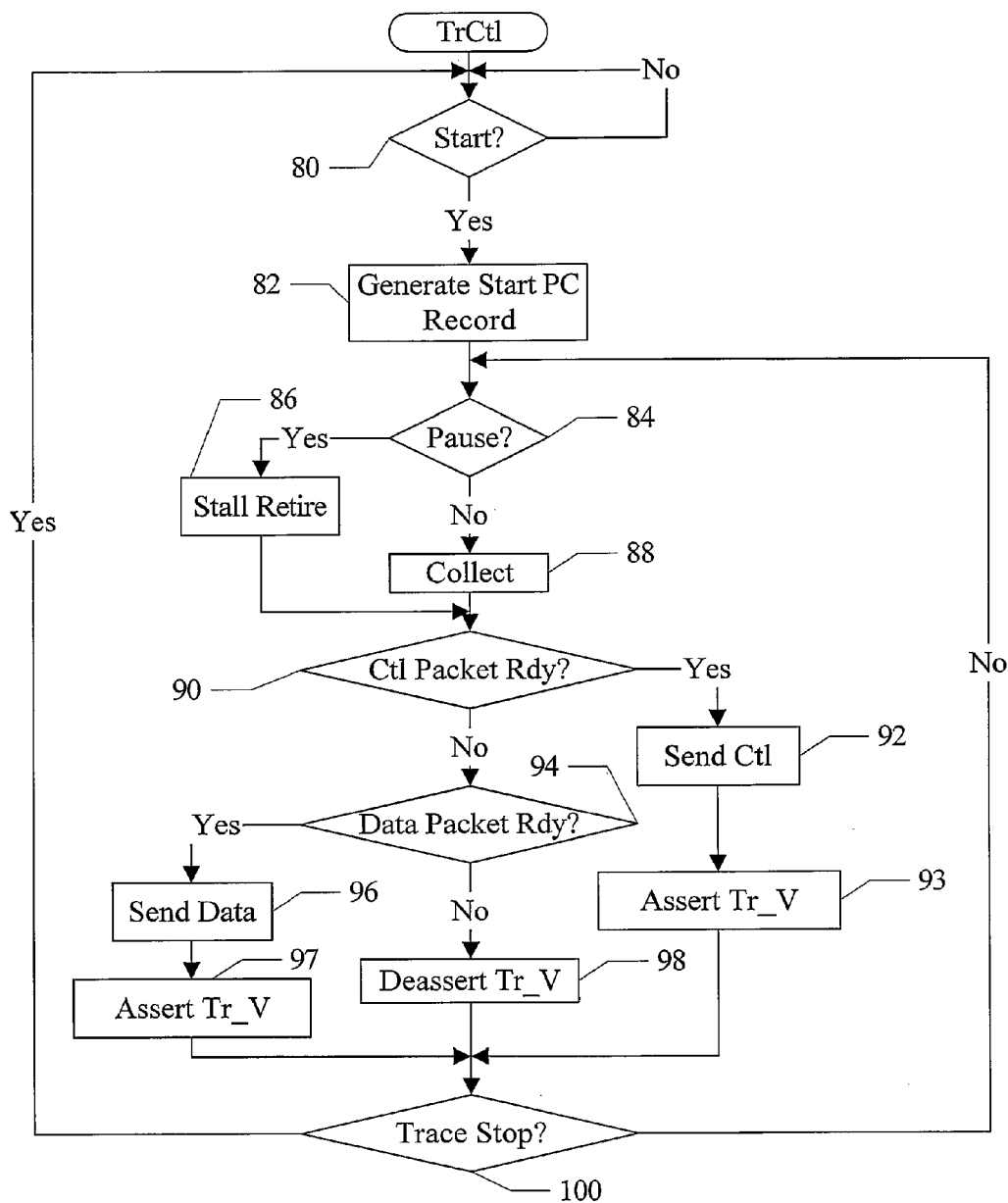
FIG. 7 is a flowchart illustrating operation of one embodiment of a trace control unit (TrCtl).

Turning next to FIG. 7, a flowchart is shown illustrating operation of one embodiment of the trace controllers 16A-16B in the processors 18A-18B. While the blocks are shown in a particular order for ease of understanding, other orders may be used. Blocks may be performed in parallel in combinatorial logic in the trace controllers 16A-16B. Blocks, combinations of blocks, and/or the flowchart as a whole may be pipelined over multiple clock cycles.

The trace controller may determine if tracing is to start (decision block 80). Tracing may be started based on various triggers, if tracing is enabled, as described above. Specifically, tracing may start if the privilege level of the processor changes, the new privilege level is one that is enabled for tracing, and the previous privilege level is not enabled for tracing. Tracing may be triggered based on opcode match, debug register match, etc. Tracing may also be started manually via software. If tracing is not ready to start (decision block 80, "no" leg), the trace controller is idle. If tracing is ready to start (decision block 80, "yes" leg), the trace controller may generate the start PC record, recording the starting PC and the privilege level (block 82). If the trace controller receives the stop signal assertion from the trace control unit 54, requesting that tracing be paused for DMA, for example (decision block 84, "yes" leg), the trace controller may back pressure the pipelines in the processor to prevent retiring of additional instructions (block 86). The back pressure may continue until the stop signal is deasserted. If the stop signal is not asserted (decision block 84, "no" leg), the trace controller may continue to collect trace information (block 88). Additional details for one embodiment are shown in FIG. 8 and discussed below.

If enough control records have been accumulated to form a control packet or if the processor is paused (decision block 90, "yes", leg), the trace controller may transmit the control packet, asserting the Tr_V signal (blocks 92 and 93). If not (decision block 90, "no" leg), and a data packet is ready to be transmitted (decision block 94, "yes" leg), the trace controller may transmit the data packet, again asserting the Tr_V signal (blocks 96 and 97). Otherwise (decision block 90 "no" leg and decision block 94, "no" leg), the trace controller has no packet to transmit and it deasserts the Tr_V signal (block 98). If a condition has been detected that causes tracing to stop (decision block 100, "yes" leg), the trace controller may terminate tracing and await the next start trigger. Stopping the trace may include detecting a privilege level change to a privilege level for which tracing is not enabled, via a debug register or opcode match, or manual stop via software. Otherwise (decision block 100, "no" leg), tracing continues.

As can be seen from blocks 90-98, there are no ordering constraints between control packets and the corresponding data packets. Accordingly, the complexity of the trace controller may be eased, in some embodiments.

Figure 8:
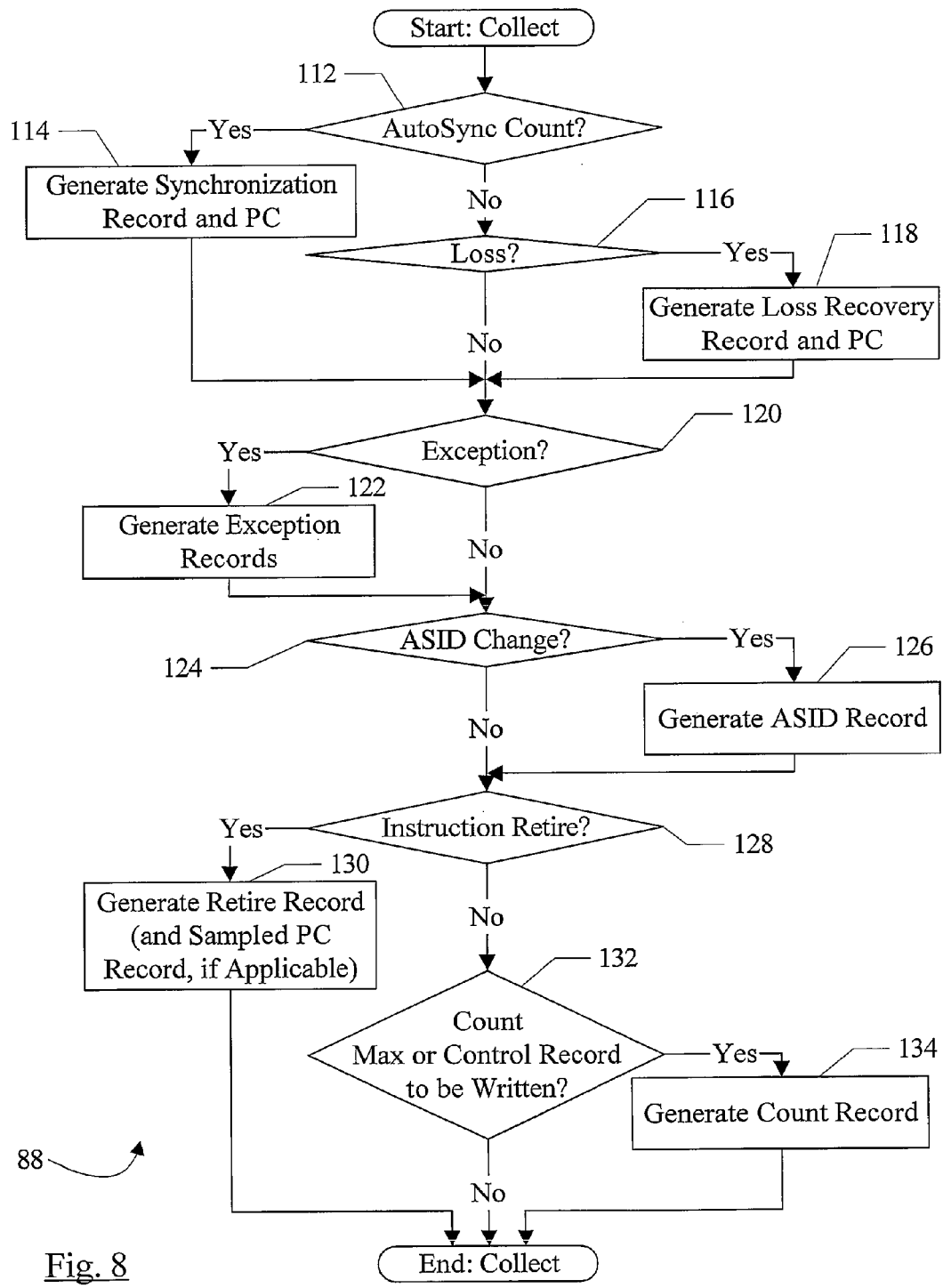
FIG. 8 is a flowchart illustrating one embodiment of a collect operation shown in FIG. 7.

FIG. 8 is a flowchart illustrating one embodiment of the collection block 88 shown in FIG. 7. While the blocks are shown in a particular order for ease of understanding, other orders may be used. Blocks may be performed in parallel in combinatorial logic in the trace controllers 16A-16B. Blocks, combinations of blocks, and/or the flowchart as a whole may be pipelined over multiple clock cycles.

If the autosync is enabled and the autosync count has expired (decision block 112, "yes" leg), the trace controller may generate the synchronization control record and a corresponding data record with the PC (block 114). If there is a loss of trace records (decision block 116, "yes" leg), the trace controller may generate a loss recovery PC record and a corresponding data record of the current PC (block 118). It is noted that the loss may be detected locally by the trace controller 16A-16B (e.g. buffer overrun or conflict within the processor) or may be signalled from the transaction trace unit 40. In the illustrated embodiment, the synchronization record and the loss recovery record are mutually exclusive. If a synchronization record is being generated at the same time that loss is occurring, then the loss recovery record may be redundant. Alternatively, the loss recovery record may be generated instead of the synchronization record, if they occur concurrently. In yet another embodiment, the loss recovery record and the synchronization record are not mutually exclusive and may be generated concurrently.

If an exception is detected (decision block 120, "yes" leg), the trace controller may generate the exception records (block 122). If an ASID change is reported (e.g. via a software write to a specified register that indicates and ASID change for tracing) (decision block 124, "yes" leg), the trace controller may generate the ASID control record and may provide the ASID from the register as a data record. If one or more instructions retire (decision block 128, "yes" leg), the trace controller may generate the retire control record (and/or the sampled PC record, if the instruction is tagged) (block 130). In one embodiment, if only control flow PCs are being traced or if only tagged instructions are being traced, decision block 128 may also represent determining if an instruction is to be traced. If the no control record count is non-zero and count records are enabled, a count record may also be generated when a control record of any other type is about to be generated. If no instruction has retired (decision block 128, "no" leg) and if no other control record has been generated, the trace controller may increment the no control record count. If the no control record count has reached its maximum value or the count record is to be written because another control record is about to be generated (e.g. on the next clock cycle) (decision block 132, "yes" leg), the trace controller may generate the count record (block 134). In one embodiment, count records are optional based on the tracing mode, and may not be generated if not enabled.

Unless otherwise noted above, the decision blocks 110, 112, 116, 120, 124, 128, and 132 may be independent and may be implemented, at least in part, in parallel combinatorial logic. Any combinatorial logic that implements the flowchart of FIG. 8 may be used.

Figure 9:
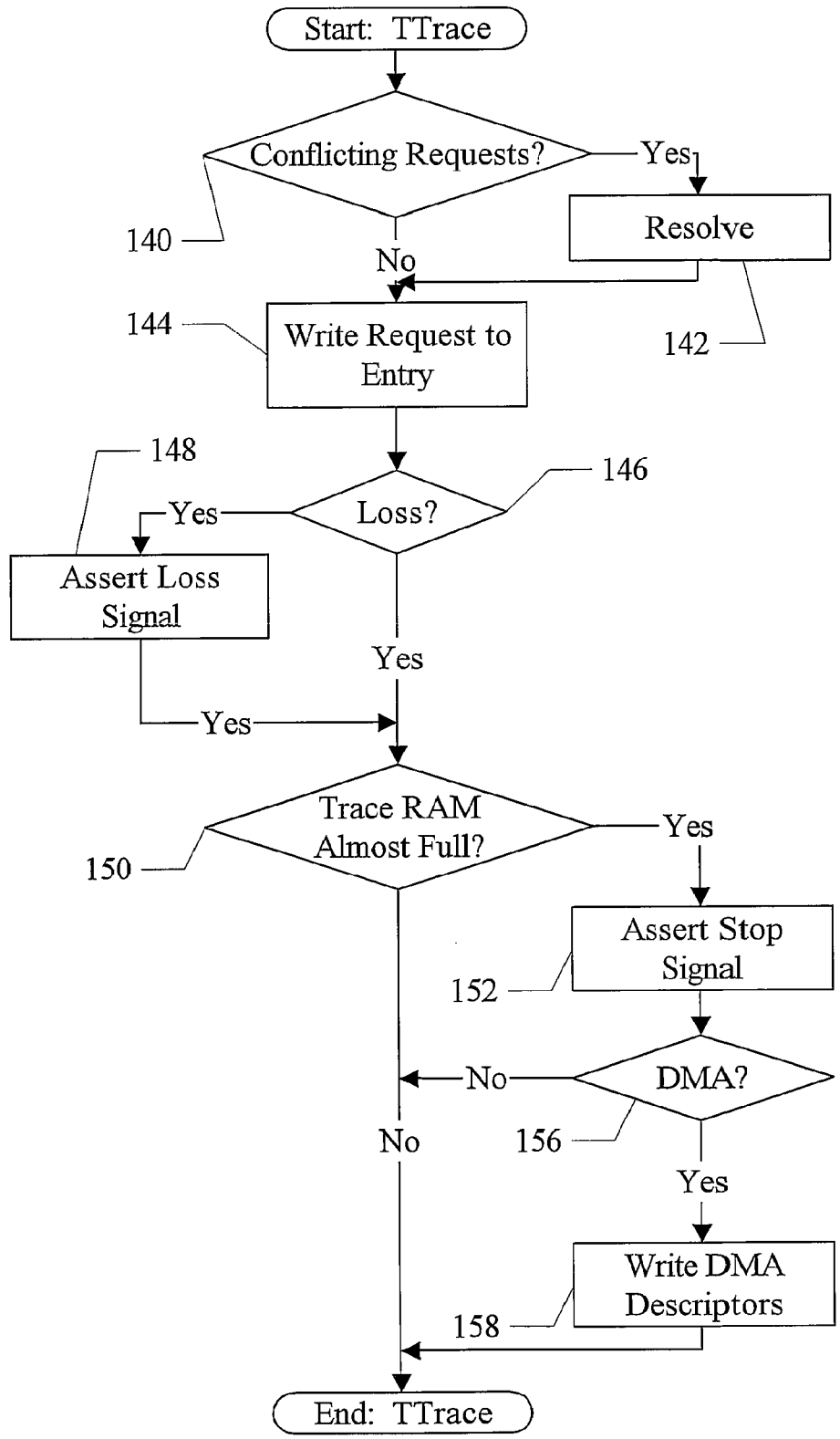
FIG. 9 is a flowchart illustrating operation of one embodiment of a transaction trace unit (TTrace) shown in FIGS. 1 and 2.

Turning next to FIG. 9, a flowchart illustrating one embodiment operation of the transaction trace unit 40 (and more particularly the trace control unit 54, in one embodiment) is shown. While the blocks are shown in a particular order for ease of understanding, other orders may be used. Blocks may be performed in parallel in combinatorial logic in the transaction trace unit 40. Blocks, combinations of blocks, and/or the flowchart as a whole may be pipelined over multiple clock cycles.

The trace control unit 54 may receive requests from the trace record sources, and if there are any conflicting requests, the trace control unit 54 may resolve the conflict to pick at least one request using the implemented arbitration scheme (decision block 140 and block 142). The request is written to the trace memory 56 (block 144). The trace control unit 54 may also update the information field 74 of the entry. If the resolving of conflicting requests resulted in loss of a PC trace record (decision block 146, "yes" leg), the trace control unit 54 may assert the loss signal to the affected processor 18A-18B (block 148). The affected processor 18A-18B may be one processor, if the other processor won the arbitration, or both processors, if the interface trace unit 38 won the arbitration.

If the trace memory 56 is almost full (decision block 150, "yes" leg), the trace control unit 54 may assert the stop signal (block 152). If the trace control unit 54 is configured to use the DMA controller 14 to empty the trace memory 56 (decision block 156, "yes" leg), the trace control unit 54 may be configured to write one or more DMA descriptors to cause the DMA controller 14 to perform the DMA (block 158). In one embodiment, the DMA controller 14 may include one or more flags, and a DMA descriptor may be made dependent on the flag. In such an embodiment, a DMA channel may be created by software having alternating DMA descriptors dependent on the flag and DMA descriptors that perform the DMA copying data from the trace memory 56 to other addresses in the memory space. The trace control unit 54 may be configured to write the flag, permitting the next DMA in the channel to be performed, rather than writing the descriptors.

Figure 10:
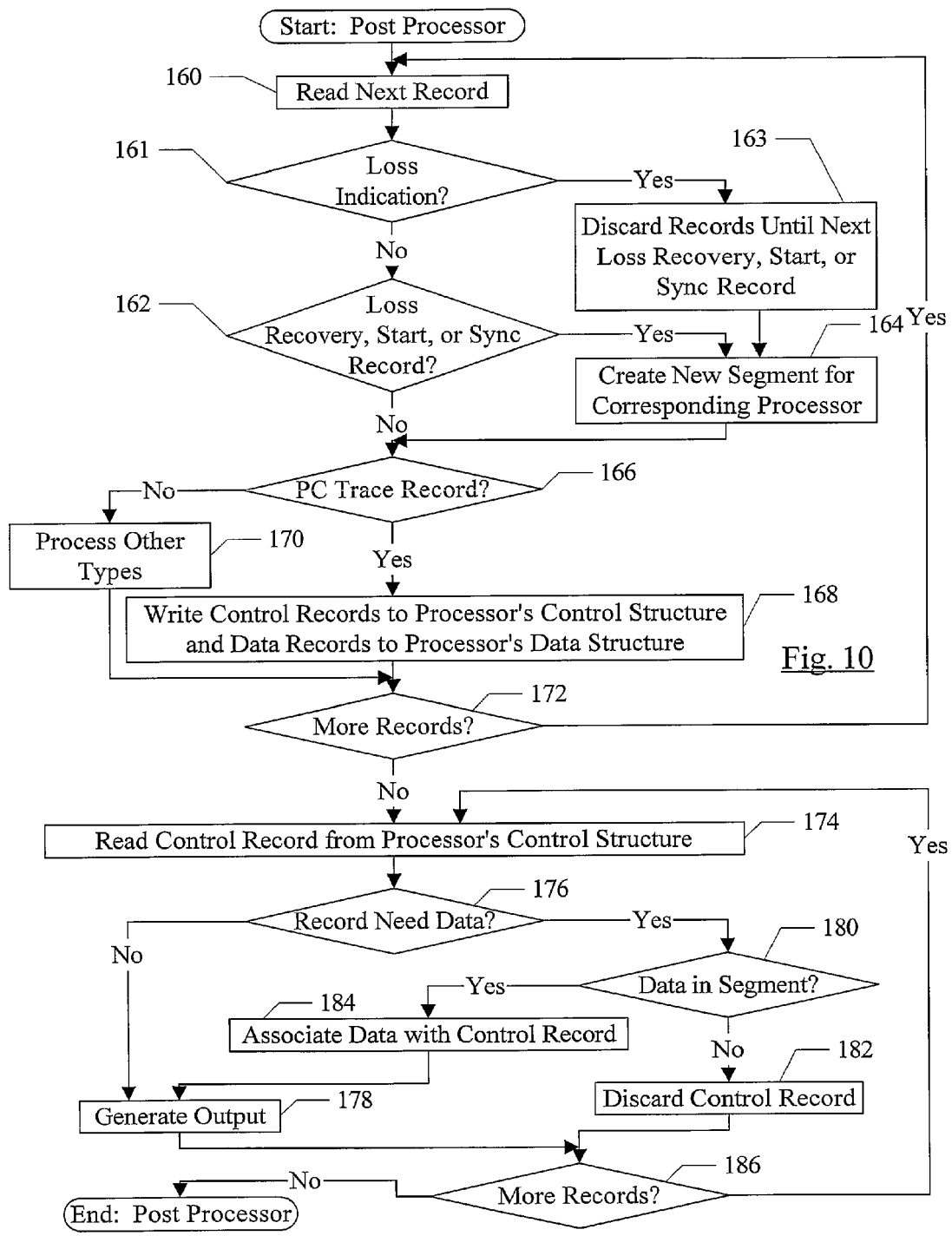
FIG. 10 is a flowchart illustrating operation of one embodiment of a post processor.

Turning next to FIG. 10, a flowchart is shown illustrating one embodiment of a post processor that may process the trace records (e.g. for use in a debugger). The post processor may comprise instructions which, when executed, implement the operation shown in FIG. 10. The post processor may be executed on the system 10, or the post processor may execute on a separate system to which the trace records are transmitted.

The post processor may parse through the trace records, and may separate each processor's PC trace records (and may further separate each processor's PC trace records into control records and data records). That is, the post processor may have a control record data structure and a data record data structure for each processor, and may write the records into the data structures, maintaining order within a given data structure. Additionally, the post processor may separate other trace records, such as interface trace records, into separate data structures. The post processor may then match up control records and corresponding data records for each processor. The embodiment shown in FIG. 10 illustrates such a "two step" process, in which the data structures of control and data records are created (blocks 160-172) and then the data structures are processed (blocks 174-186). In other embodiments, control records and data record may be matched up "on the fly" as the trace data is parsed. If a data record cannot be matched up with a control record when it is read, it may be retained until it is matched up. Similarly, if a control record requires a data record, it can be retained until it is matched up.

As illustrated in FIG. 10, the post processor may read a trace record (block 160), and may determine what type of record has been read (PC control record, PC data record, or other). If the info field associated with the trace record has the loss indication set (decision block 161, "yes" leg), the post processor may discard records until the next record that provides a full PC (e.g. a loss recovery, start, or synchronization record, in this embodiment—block 163). Only records corresponding to the processor for which loss is detected are discarded. Additionally, a new segment may be created for the corresponding processor, beginning with the start, loss recovery, or synchronization record (block 164). If the record is a loss recovery, start, or synchronization record (decision block 162, "yes" leg), the post processor may create a new segment for the corresponding processor (block 164). Trace records for the corresponding processor that were before the loss recovery record, if the loss recovery record is detected, are stored in the previous segment, and thus a clean break may be created to begin storing records that are after the point of loss. If the record is a PC trace record (as opposed to an interface trace record, for example) (decision block 166, "yes" leg), the post processor may write the record to the corresponding processor's control record data structure or the processor's data record data structure (block 168). If the record is a non-PC trace record (decision block 166, "no" leg), the post processor may process those record types as defined by the other trace mechanisms (block 170). If there are more records to process (decision block 172, "yes" leg), the post processor reads the next record for processing (block 160).

Once the records have been parsed, the post processor may begin matching control records and data records. For each processor 18A-18B, the post processor may read a control record from the control record data structure (block 174). If the control record does not require a data record (decision block 176, "no" leg), the post processor may generate the output (e.g. one or more PCs, based on the most recently generated PC and the control record) (block 178). The content and form of the output is implementation dependent, and may including reading the program file to identify instructions corresponding to PCs in the trace (e.g. to obtain direct branch target addresses). It is noted that other sources of data may be consulted to determine if the control required requires a data record. For example, a retire record may identify a taken branch, and the post processor may read the program file to determine if the branch is indirect or not to determine if a data record is required.

If the control record does require a data record (decision block 176, "yes" leg), the post processor may determine if there is still data left in the current segment (decision block 180). If the control record is a loss recovery record, the current segment is the new segment created when the loss recovery record was created, and the data will be found. For other control records, it is possible that the segment will terminate before the data is found. If the data is not found (decision block 180, "no" leg), the post processor may discard the control record and move to the next data segment (block 182). If the data record is found (decision block 180, "yes" leg), the post processor may associate the data with the control record (block 184) and may generate the output (block 178).

If there are more control records to be processed (decision block 186, "yes" leg), the post processor may read the next control record and continue processing (block 174).

Figure 11:
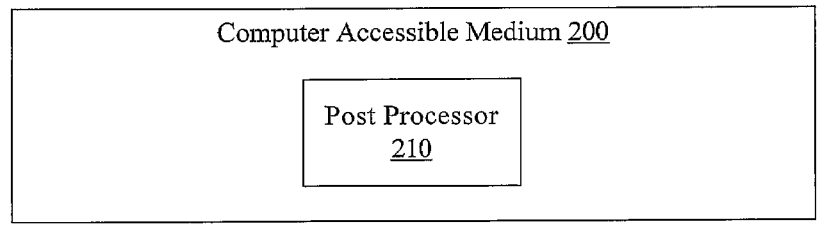
FIG. 11 is a block diagram of one embodiment of a computer accessible medium.

Turning next to FIG. 11, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link. The computer accessible medium 200 in FIG. 11 may store a post processor 210, which may implement the flowchart of FIG. 10. Generally, the computer accessible medium 200 may store any set of instructions which, when executed, implement a portion or all of the flowcharts shown in FIG. 10.

Figure 12:
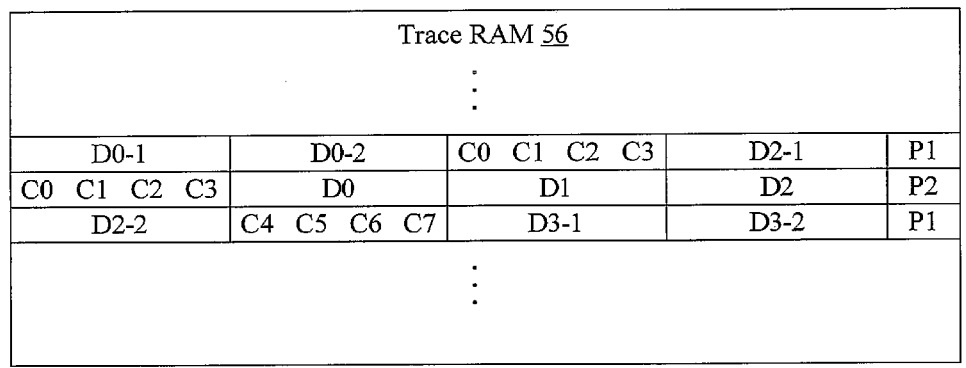
FIG. 12 is an example of data in the trace memory for one embodiment.
Figure 12:
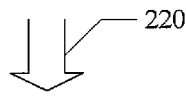

FIG. 12 is an example of three consecutive records in the trace memory 56 and corresponding post-processed trace data for the two processors. FIG. 12 illustrates interleaving of trace records from different sources (e.g. processors 18A-18B, noted in FIG. 12 as P1 and P2, respectively), as well as data and control records in arbitrary order. Each entry has four packets. Data packets are labeled with a "D", and control packets are labeled with control records beginning with a "C". The number following the D or C indicates the order of the control records and the association of data and control. For data records that include two data packets, the packets are labeled "–1" and "–2".

Accordingly, the first entry corresponds to P1 and includes the first data record (D0-1 and D0-2) followed by a control packet including control records C0 (to which D0-1 and D0-2 are associated), C1, C2, and C3. Accordingly, the data record D0 appears before the control record C0. Other data records in this example appear after their associated control record. A data record for control record C2 begins as the last data packet of the first entry (D2-1), and is continued in the third entry (D2-2). The third entry further includes a control packet (control records C4, C5, C6, and C7) and data packets forming a data record for the control record C3 (D3-1 and D3-2). In the second entry, packets for P2 are stored, interleaved between the P1 packets. The P2 entry includes control records C0, C1, C2, and C3; and data records for the first three controller records (D0, D1, and D2). In this example, P2 is performing 32 bit PC tracing while P1 is performing 64 bit PC tracing. Below the arrow 220 in FIG. 12 are the P1 and P2 PC traces, with control records and associated data records grouped together.

Numerous variations and modifications will become apparent to those skilled in the art once the above disclosure is fully appreciated. It is intended that the following claims be interpreted to embrace all such variations and modifications.

What is claimed is:

1. A system comprising:
a first processor configured to output a plurality of program counter (PC) trace records, wherein the plurality of PC trace records provide data indicating the PCs of instructions retired by the first processor; and
a trace unit coupled to receive the plurality of PC trace records from the first processor, wherein the trace unit comprises a trace memory into which the trace unit is configured to store the plurality of PC trace records; and
wherein each PC trace record includes an encoding that identifies a PC trace record type, wherein one encoding identifies the PC trace record as a loss recovery record which was generated in response to one or more PC trace records being dropped in a lossy trace mode, and wherein at least one other encoding identifies the PC trace record as a retire record which indicates successfully retired instructions including taken branches; and
wherein the first processor is configured to output the loss recovery record, wherein the loss recovery record indicates the recovery PC at which tracing is recovered after the one or more dropped PC trace records.

2. The system as recited in claim 1 wherein the first processor is configured to drop the one or more dropped PC trace records in response to detecting an internal conflict that prevents recording the one or more dropped PC trace records, and wherein the first processor is configured to generate the loss recovery record in response to dropping the one or more dropped PC trace records.

3. The system as recited in claim 1 further comprising a second source of trace records, wherein the trace unit is configured to arbitrate between the second source and the first processor to write records to the trace memory in response to the second source and the first processor providing trace records concurrently, and wherein the trace unit is configured to indicate loss to the first processor responsive to selecting the second source to write the records in the case of the conflict, and wherein the first processor is configured to generate the loss recovery record responsive to the indication from the trace unit.

4. The system as recited in claim 3 wherein the first processor includes a buffer configured to store one or more queued PC trace records, and in response to receiving the indication from the trace unit, the processor is configured to transmit the queued PC trace records prior to the loss recovery record, and wherein the first processor is configured to provide a second indication that the queued PC trace records are subsequent to the indication of loss from the trace unit and prior to the loss recovery record.

5. The system as recited in claim 4 wherein the trace unit is configured to update a control field associated with an entry to which the queued PC trace records are written to indicate that the queued PC trace records are subsequent to the one or more dropped PCs and prior to the loss recovery record.

6. An integrated circuit comprising:
a first processor configured to output a plurality of program counter (PC) trace records, wherein the plurality of PC trace records provide data indicating the PCs of instructions retired by the first processor, wherein the processor includes a trace controller configured to generate the plurality of PC trace records;

a second source configured output a plurality of trace records;

a trace unit coupled to receive the plurality of PC trace records from the first processor and the plurality of trace records from the second source, wherein the trace unit comprises a trace memory into which the trace unit is configured to store the plurality of PC trace records and the plurality of trace records; and wherein the integrated circuit is configured to operate in a lossy trace made in which trace records are permitted to be dropped in cases in which conflicts prevent the recording of one or more trace records, and wherein the trace controller is configured to output a loss recovery record responsive to one or more PC trace records being dropped, wherein the loss recovery record indicates the recovery PC at which tracing is recovered after the one or more PC trace records being dropped;

wherein the trace unit is configured to detect a conflict in the lossy mode, and wherein the trace unit is configured to communicate to the trace controller that the one or more of the plurality of PC trace records were dropped in response to selecting the second source to resolve the conflict; and wherein the integrated circuit is configured to operate in a lossless trace mode in which trace records are not dropped, and wherein the trace controller is configured to backpressure the first processor to prevent retirement of instructions in response to conflicts that would otherwise lead to one or more PC trace records being dropped.

7. The integrated circuit as recited in claim 6 wherein the trace unit is configured to detect a conflict between one or more of the plurality of trace records provided concurrent with one or more of the plurality of PC trace records for storage in the trace memory, and wherein the trace unit is configured to communicate to the trace controller to backpressure the first processor in the lossless mode responsive to selecting the second source to write the one or more of the plurality of trace records to resolve the conflict.

8. The integrated circuit as recited in claim 6 wherein, in the lossy mode, the first processor is configured to detect an internal conflict that leads to a loss of a second one or more PC trace records, and wherein the trace controller is configured to generate the loss recovery record in response to the loss.

9. An integrated circuit comprising:

a first processor configured to output a plurality of program counter (PC) trace records, wherein the plurality of PC trace records provide data indicating the PCs of instructions retired by the first processor, wherein the processor includes a trace controller configured to generate the plurality of PC trace records;

a second source configured output a plurality of trace records;

a trace unit coupled to receive the plurality of PC trace records from the first processor and the plurality of trace records from the second source, wherein the trace unit comprises a trace memory into which the trace unit is configured to store the plurality of PC trace records and the plurality of trace records;

a direct memory access (DMA) controller configure to perform DMA operations, wherein the integrated circuit is configured to operate in a continuous tracing mode in which the DMA controller performs DMA operations to empty the trace memory while additional trace records are being written to the trace memory; and wherein the integrated circuit is configured to operate in a lossy trace made in which PC trace records are permitted to be dropped in cases in which conflicts prevent the recording of one or more trace records, and wherein the trace controller is configured to output a loss recovery record responsive to one or more PC trace records being dropped, wherein the loss recovery record indicates the recovery PC at which tracing is recovered after the one or more PC trace records being dropped; and wherein the integrated circuit is configured to operate in a lossless trace mode in which trace records are not dropped, and wherein the trace controller is configured to backpressure the first processor to prevent retirement of instructions in response to conflicts that would otherwise lead to one or more PC trace records being dropped.

10. The integrated circuit as recited in claim 9, wherein the first processor comprises one or more buffers to accumulate the PC trace records, and wherein the first processor is configured to detect a conflict in updates to the one or more buffers that leads to one or more of the PC trace records being dropped, and wherein the first processor is configured to generate the loss recovery record responsive to the conflict.

11. The integrated circuit as recited in claim 9, wherein during operation in the lossy trace mode, the trace unit is configured to notify the first processor that PC trace records have been dropped in response to the trace memory unit being full.

12. A processor comprising a trace controller, wherein the trace controller is configured to generate program counter (PC) trace records that represent the PCs of instructions retired by the processor, wherein the trace controller is configured to transmit the PC trace records to an external trace unit to be recorded, wherein the trace controller is configured to generate a loss recovery record in a lossy tracing mode in response to one or more of the PC trace records being dropped, and wherein the trace controller is coupled to receive an indication from the external trace unit indicating that the one or more PC trace records have been dropped, and wherein the trace controller is configured to generate the loss recovery record responsive to the indication from the external trace unit.

13. The processor as recited in claim 12 wherein the trace controller comprises one or more buffers to accumulate the PC trace records, and wherein the trace controller is configured to detect a conflict in the updates to the one or more buffers that leads to one or more of the PC trace records being dropped, and wherein the trace controller is configured to generate the loss recovery record responsive to the conflict.

14. The processor as recited in claim 12 wherein, in a lossless tracing mode, the trace controller is configured to stall one or more pipelines in the processor to prevent loss of PC trace records.

15. A processor comprising:

a trace controller configured to generate program counter (PC) trace records that represent the PCs of instructions retired by the processor;

wherein the trace controller is configured to transmit the PC trace records to an external trace unit to be recorded;

wherein the trace controller is configured to generate a loss recovery record in a lossy tracing mode in response to one or more of the PC trace records being dropped;

wherein the trace controller comprises one or more buffers to accumulate the PC trace records, wherein the trace controller is configured to transmit one or more accumulated PC trace records that are in the buffers prior to transmitting the loss recovery record, and wherein the trace controller is configured to identify the accumulated PC trace records as being between the lost PC trace records and the loss recover record to permit the discard of accumulated PC trace records.

16. A computer accessible storage medium storing a plurality of instructions forming a post processing program, wherein the post processing program, when executed:
processes a plurality of program counter (PC) trace records output by a processor, generating an output segment listing the PCs indicated by the plurality of PC trace records;
during the processing, detects a loss indication identifying one or more PC trace records as being subsequent to one or more PC trace records that were not included in the trace and prior to a loss recovery record that includes information to continue the trace after the loss;
discards the one or more PC trace records identify by the loss indications until a loss recovery record is detected.

17. The computer accessible storage medium as recited in claim 16 wherein the post processing program, when executed:
detect the loss recovery record;
initiate a second output segment of PCs that are subsequent to the loss recovery record, the loss recover record including at least an initial PC for the second output segment.

18. The computer accessible storage medium as recited in claim 16 wherein at least some of the plurality of PC trace records comprise control records and corresponding data record, and wherein the post processing program, when executed:
detects a first control record of a first PC trace record that is prior to the loss;
detects that a corresponding first data record for the first control record is not included in the plurality of PC trace records that are prior to the loss recovery record; and
discards the first control record, even in the case that the first control record is not identified by the loss indication, in response to detecting that the corresponding first data record is not included.

19. The computer accessible storage medium as recited in claim 16 wherein the post processing program, when executed:
parses a plurality of trace records including the plurality of PC trace records and trace records from one or more other sources; and
separates the plurality of PC trace records into a data structure separate from one or more data structures storing the trace records from the one or more other sources.

20. A method comprising:
a processor collecting program counter (PC) trace records identifying PCs of instructions retired by the processor;
the processor transmitting the PC trace records to a trace unit;
the trace unit writing the PC trace -records to a trace memory, wherein the trace unit is further configured to write trace records from at least one other source to the trace memory;
the processor detecting a loss of at least one PC trace record in a lossy trace mode;
the processor generating a loss recovery record that provides data to continue tracing with a PC included in the loss recovery record;
the processor buffering one or more PC trace records at a time the loss occurs;
the trace unit receiving the buffered one or more PC trace records and associating a loss indictor within the buffered one or more PC trace records in the trace memory; and
discarding the buffered one or more PC trace records responsive to the loss indicator.

21. The method as recited in claim 20 wherein the discarding is performed by a computer executing a post processing program on data output from the trace memory.

22. The method as recited in claim 20 wherein the loss occurs at the trace unit due to a conflict to update the trace memory.

23. The method as recited in claim 20 wherein the loss occurs internal to the processor.

* * * * *